May 29, 1945. R. D. LACOE, JR 2,377,017
MASTER CYLINDER
Filed Dec. 27, 1941
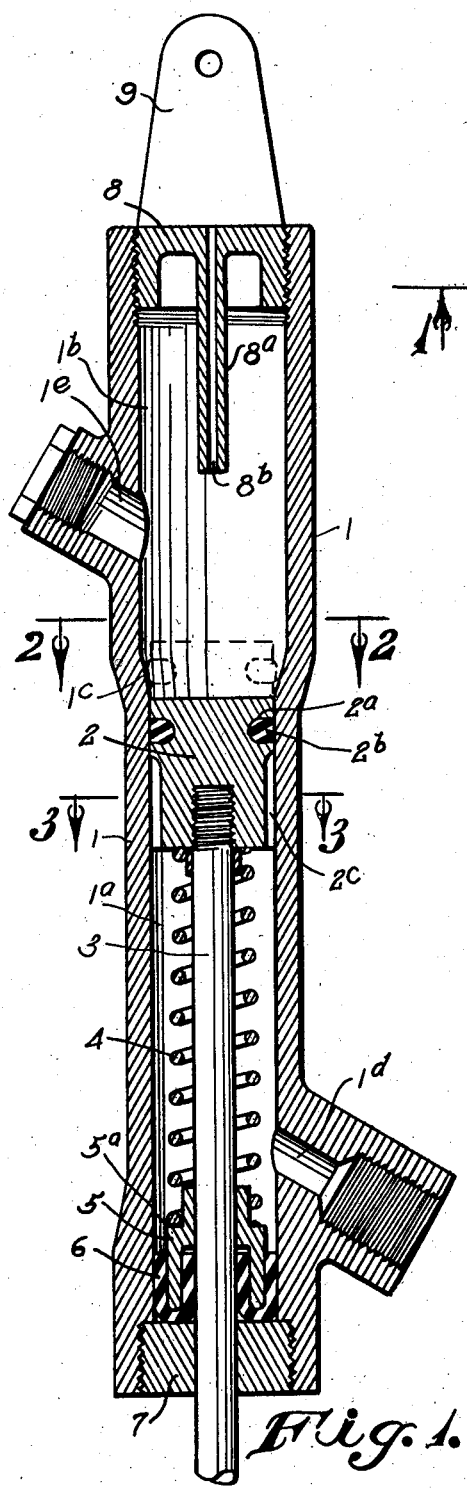
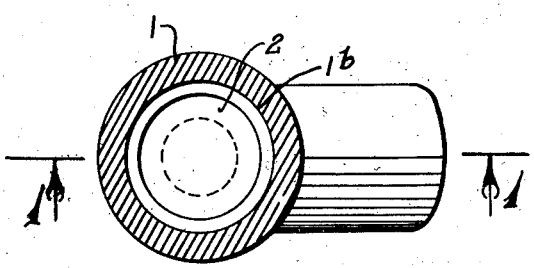
Fig. 2.
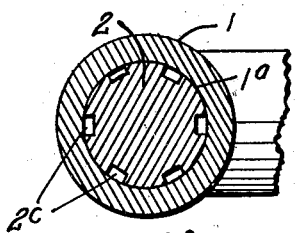
Fig. 3.
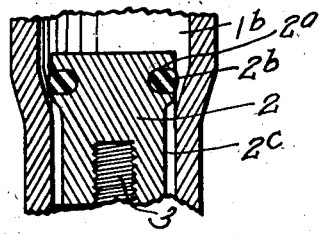
Fig. 4.
Fig. 1.
INVENTOR.
Ralph D. Lacoe Jr
BY A.B. Bowman
ATTORNEY.

Patented May 29, 1945

2,377,017

UNITED STATES PATENT OFFICE 2,377,017

MASTER CYLINDER

Ralph D. Lacoe, Jr., San Diego, Calif.

Application December 27, 1941, Serial No. 424,675

5 Claims. (Cl. 60—54.6)

My invention relates to master cylinders of the hydraulic type used in connection with hydraulic brakes or other hydraulic controlled apparatus and the objects of my invention are:

First, to provide a very simple means of communication between the cylinder and reservoir of this class to eliminate certain causes of leakage;

Second, to provide a very simple master cylinder of this class which compensates for fluid contraction and expansion in the system;

Third, to provide a very simple master cylinder of this class arranged to remove air from the brake or like system;

Fourth, to provide a very simple master cylinder of this class which prevents the leakage of fluid from the brake or like system;

Fifth, to provide a very simple master cylinder of this class which is applicable for use for various purposes and is easily applied in connection with various systems of hydraulic control;

Sixth, to provide a master cylinder of this class in which the hydraulic fluid supply is in the cylinder and not in a separate reservoir; and Seventh, to provide a master cylinder of this class which is very simple and economical of construction, efficient in its action and which will not readily deteriorate or get out of order;

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a longitudinal sectional view of my master cylinder showing some of the parts and portions in elevation to facilitate the illustration and showing the plunger in inoperative position; Fig. 2 is a transverse sectional view taken from the line 2—2 of Fig. 1; Fig. 3 is a transverse sectional view taken from the line 3—3 of Fig. 1, and Fig. 4 is a fragmentary longitudinal sectional view showing the plunger in operative position.

Similar characters of reference refer to similar parts and portions throughout the views of the drawing.

The cylinder 1, plunger 2, plunger rod 3, spring 4, spring bracket 5, sealing member 6, plug 7, combined plug and breather tube 8 and supporting bracket 9 constitute the principal parts and portions of my master cylinder.

The cylinder 1 is a two diameter cylinder. The smaller diameter portion 1a forming the cylinder for the plunger 2 and the larger diameter portion 1c forming an oil or hydraulic fluid reservoir. The interconnecting portion 1c between this cylinder and reservoir portion is gradually tapered, as shown.

The plunger 2 is an ordinary block cylindrical plunger provided with a ring groove 2a adapted to receive a rubber or other resilient ring 2b for sealing purposes. This plunger 2 is also provided with longitudinal grooves 2c therein and is adapted to reciprocate backwardly and forwardly carrying the ring 2b over the inclined portion 1c, as shown by solid and dash lines in Fig. 1 of the drawing. Thus it will be noted that the sealing ring passes from the smaller diameter to the larger diameter into the inclined portion 1c. Screw-threaded into this plunger 2 is a plunger rod 3 which extends backwardly to the small diameter portion of said cylinder and is supported in a plug 7 which is screw threaded into the end of the cylinder portion 1a at its extremity.

Mounted on the plunger rod 3 is a spring bracket 5 which is adapted to receive the one end of a spring 4 positioned against a shoulder 5a at one end of said spring. The other end of said spring 4 engages the plunger 2. This spring 4 is a compression spring and tends to force the plunger 2 outwardly toward the dash line position, as shown in Fig. 1 of the drawing. This bracket 5 is provided with a cylindrical portion 5b which is spaced between the rod 3 and the inner wall of the portion 1a of the cylinder 1. Positioned over this portion 5b between said portion and the connecting rod 3 and the inner wall of the cylinder portion 1a is a U-shaped in cross section sealing member which is preferably made of rubber, as shown, which forms a seal against escape of the hydraulic fluid around the connecting rod. This connecting rod 3 is connected with an operating lever or other operating mechanism wherein the operator tends to compress the spring 4 and draw the plunger 2 into the receded position, as shown by solid lines in Fig. 1 of the drawing and when released the spring 4 will force this plunger to the dash line position shown therein. Communicating with this cylindrical portion 1a between the plunger 2 and the end is a port 1d which communicates with the oil line and other working apparatus of the control system and communicating with the reservoir portion 1b of the cylinder 1 is another port 1e which is provided with a plug 1f and this port is a filler opening for the purpose of supplying any deficiency in the fluid supply in the system to the reservoir 1b when desired.

Screw-threaded in the end of the reservoir portion 1b of the cylinder 1 is a combined plug and breather tube 8 which is provided with a bracket 9 for supporting the cylinder, as desired. It will be here noted that the support 9 may be substituted by other means of supporting the cylinder, said bracket only being a preferred structure for supporting said cylinder. This plug 8 is provided centrally with an extended breather tube portion 8a which is provided with a central opening 8b therethrough. It will be here noted that this breather tube portion 8a is positioned above the fluid level in reservoir 1b.

The operation of my master cylinder is substantially as follows: The master cylinder is supported by the bracket 9 or otherwise as desired in vertical position with the reservoir up. When the plunger rod 3 is forced downwardly compressing the spring 4 by any operative mechanism, the plunger 2 is moved from position shown in Fig. 4 to the position as shown in Fig. 1 of the drawing and hydraulic fluid, preferably oil is forced through the port 1d to various actuating devices for operation, it being understood that the entire system is filled with the hydraulic liquid including an oil supply in the reservoir 1b. When the pressure on the plunger rod 3 is released, the spring 4 forces the plunger to the right in the dash line position, as shown in Fig. 1 of the drawing, together with the plunger rod and permits equalization of oil in the operating lines, thereby automatically replenishing any leakage from the master cylinder and compensating for any expansion and contraction of the fluid, the plunger 2 being shifted far enough to the right to permit the flow of fluid past the ring 2b at the inclined portion 1c of the cylinder 1. The breather tube 9a permits the shifting of the plunger when the system is full of fluid and the reservoir filled to just below the end of the tube 9a.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a master cylinder of the class described, the combination of a cylinder member provided with a small diameter cylinder and guide portion at one end and a larger diameter reservoir portion at its opposite end and interconnected by an inclined wall portion and a plunger member reciprocably mounted within and guided by said small diameter cylinder portion and provided with a resilient sealing member which sealing member is positioned and arranged to reciprocate with said plunger member within and outwardly from said small diameter cylinder portion into said inclined wall portion for clearing said resilient sealing member from the wall of said cylinder.

2. In a master cylinder of the class described, the combination of a cylinder member provided with a small diameter cylinder and guide portion at one end and a larger diameter reservoir portion at its opposite end and interconnected by an inclined wall portion, a plunger member reciprocably mounted within and guided by said small diameter cylinder portion and provided with a resilient sealing member which sealing member is positioned and arranged to reciprocate with said plunger member within and outwardly from said small diameter cylinder portion into said inclined wall portion for clearing said resilient sealing member from the wall of said cylinder, said plunger member provided with grooves longitudinally therein from near said resilient sealing member to the opposite end thereof.

3. In a master cylinder of the class described, the combination of a cylinder member provided with a small diameter cylinder and guide portion at one end and a larger diameter reservoir portion at its opposite end and interconnected by an inclined wall portion, a plunger member reciprocably mounted within and guided by said small diameter cylinder portion and provided with a resilient sealing member which sealing member is positioned and arranged to reciprocate with said plunger member within and outwardly from said small diameter cylinder portion into said inclined wall portion for clearing said resilient sealing member from the wall of said cylinder, said plunger member provided with grooves longitudinally therein from near said resilient sealing member to the opposite end thereof, means tending to shift said plunger member in said cylinder and guide portion toward and partially into said reservoir portion, means to facilitate the shifting of said plunger member away from said reservoir portion, a service port in communication with said small diameter cylinder and guide portion between the plunger and the end of said small diameter cylinder and breather tube means in communication with said reservoir portion above the oil level therein.

4. In a master cylinder of the class described, the combination of a cylinder member provided with a relatively small diameter cylinder and guide portion at one end and a relatively large diameter reservoir portion at its opposite end and interconnected by an inclined wall portion, a plunger member reciprocably mounted within said cylinder and guide portion, a resilient sealing ring in the wall of said plunger member near the reservoir end of said cylinder and so arranged in said plunger to reciprocate with said plunger from said smaller diameter cylinder and guide portion into said inclined wall portion for clearing said resilient sealing ring from said inclined wall portion.

5. In a master cylinder of the class described, the combination of a cylinder member provided with a relatively small diameter cylinder and guide portion at one end and a relatively large diameter reservoir portion at its opposite end and interconnected by an inclined wall portion, a plunger member reciprocably mounted within said cylinder and guide portion, a resilient sealing ring in the wall of said plunger member near the reservoir end of said cylinder and so arranged in said plunger to reciprocate with said plunger from said smaller diameter cylinder and guide portion into said inclined wall portion for clearing said resilient sealing ring from said inclined wall portion, said plunger member provided with longitudinal grooves therein extending from near said resilient sealing ring to the opposite end of said plunger member.

RALPH D. LACOE, Jr.